US009825335B2

(12) United States Patent
Lim et al.

(10) Patent No.: US 9,825,335 B2
(45) Date of Patent: Nov. 21, 2017

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Young Min Lim, Daejeon (KR); Chul Haeng Lee, Daejeon (KR); Doo Kyung Yang, Daejeon (KR); Shul Kee Kim, Daejeon (KR)

(73) Assignee: LG Chem, Ltd. (KR)

( * ) Notice: Subject to any disclaimer, the term of this patent is extended or adjusted under 35 U.S.C. 154(b) by 487 days.

(21) Appl. No.: 14/446,449

(22) Filed: Jul. 30, 2014

(65) Prior Publication Data

US 2014/0342241 A1 Nov. 20, 2014

Related U.S. Application Data

(63) Continuation of application No. PCT/KR2014/004420, filed on May 16, 2014.

(30) Foreign Application Priority Data

May 16, 2013 (KR) ........................ 10-2013-0055887

(51) Int. Cl.
H01M 10/0568 (2010.01)
H01M 10/052 (2010.01)
H01M 10/0569 (2010.01)
H01M 4/505 (2010.01)
H01M 4/525 (2010.01)
H01M 10/0567 (2010.01)

(52) U.S. Cl.
CPC ....... *H01M 10/0568* (2013.01); *H01M 4/505* (2013.01); *H01M 4/525* (2013.01); *H01M 10/052* (2013.01); *H01M 10/0567* (2013.01); *H01M 10/0569* (2013.01); *H01M 2300/0037* (2013.01); *Y02E 60/122* (2013.01); *Y02T 10/7011* (2013.01)

(58) Field of Classification Search
CPC ......... H01M 10/0568; H01M 10/0569; H01M 10/0567; H01M 10/052; H01M 4/505; H01M 4/525; H01M 2300/0037; Y02E 60/122
See application file for complete search history.

(56) References Cited

U.S. PATENT DOCUMENTS

| 2003/0113636 | A1 | 6/2003 | Sano et al. |
| 2003/0170549 | A1 | 9/2003 | Murai |
| 2004/0106047 | A1 | 6/2004 | Mie et al. |
| 2006/0222952 | A1 | 10/2006 | Kono et al. |
| 2009/0169992 | A1 | 7/2009 | Ishiko et al. |
| 2009/0220678 | A1 | 9/2009 | Kono et al. |
| 2010/0266905 | A1 | 10/2010 | Jeon et al. |
| 2010/0285373 | A1 | 11/2010 | Horikawa |
| 2010/0304225 | A1 | 12/2010 | Pascaly et al. |
| 2011/0183218 | A1 | 7/2011 | Odani et al. |
| 2012/0258357 | A1* | 10/2012 | Kim ............... H01M 6/166 429/199 |
| 2012/0316716 | A1 | 12/2012 | Odani et al. |
| 2013/0029230 | A1 | 1/2013 | Park et al. |

FOREIGN PATENT DOCUMENTS

| CN | 1411092 A | 4/2003 |
| CN | 1435906 A | 8/2003 |
| CN | 1497765 A | 5/2004 |
| CN | 1819307 A | 8/2006 |
| CN | 101212065 A | 7/2008 |
| CN | 100409480 C | 8/2008 |
| CN | 101345301 A | 1/2009 |
| CN | 102412417 A | 4/2012 |
| CN | 102952099 A * | 3/2013 |
| JP | 2004-165151 A | 6/2004 |
| JP | 2006134777 A | 5/2006 |
| JP | 2011150958 A | 8/2011 |
| JP | 2013016456 A | 1/2013 |
| JP | 2013101900 A | 5/2013 |
| JP | 2014072071 A | 4/2014 |
| KR | 2006-0116423 A | 11/2006 |
| KR | 2008-0105045 A | 12/2008 |
| KR | 20090030237 A | 3/2009 |
| KR | 2009-0039211 A | 4/2009 |

(Continued)

OTHER PUBLICATIONS

Third Party Observation from PCT/KR2014/004420, dated Aug. 12, 2015.
Office Action from Chinese Application No. 201480003029.3, dated Aug. 16, 2016.
K. Zaghib, et al., "Safe Li-ion polymer batteries for HEV applications." Journal of Power Sources, 134 (2004) 124-129.
International Search Report from PCT/KR2014/004420, dated Aug. 25 2014.

(Continued)

*Primary Examiner* — Laura Weiner

(74) *Attorney, Agent, or Firm* — Lerner, David, Littenberg, Krumholz & Mentlik, LLP

(57) ABSTRACT

Provided are a non-aqueous electrolyte solution, which includes a non-aqueous organic solvent including propylene carbonate (PC) and ethylene carbonate (EC), and lithium bis(fluorosulfonyl)imide (LiFSI), and a lithium secondary battery including the non-aqueous electrolyte solution.

The lithium secondary battery of the present invention may improve low-temperature and room temperature output characteristics, high-temperature and room temperature cycle characteristics, and capacity characteristics after high-temperature storage by forming a robust solid electrolyte interface (SEI) on an anode during initial charge of the lithium secondary battery.

10 Claims, 4 Drawing Sheets

(56) References Cited

FOREIGN PATENT DOCUMENTS

| KR | 20090107436 A | 10/2009 |
| KR | 2010-0051794 A | 5/2010 |
| KR | 10-1165535 B1 | 7/2012 |
| KR | 10-1248108 B1 | 3/2013 |

OTHER PUBLICATIONS

Search Report from Chinese Application No. 2014800030293, dated Aug. 10, 2017.

* cited by examiner

NON-AQUEOUS ELECTROLYTE SOLUTION AND LITHIUM SECONDARY BATTERY INCLUDING THE SAME

CROSS-REFERENCE TO RELATED APPLICATIONS

The present application is a continuation of International Application No. PCT/KR2014/004420 filed on May 16, 2014, which claims the benefit of Korean Patent Application No. 10-2013-0055887, filed on May 16, 2013, the disclosures of which are incorporated herein by reference.

TECHNICAL FIELD

The present invention relates to a non-aqueous electrolyte solution which includes a non-aqueous organic solvent including propylene carbonate (PC) and ethylene carbonate (EC); and lithium bis(fluorosulfonyl)imide (LiFSI), and a lithium secondary battery including the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, LiO, or LiOH. Thus, a film may be formed on the surface of the anode. The film is denoted as "solid electrolyte interface (SEI)", wherein the SEI formed at an initial stage of charging may prevent a reaction of the lithium ions with the carbon anode or other materials during charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and the SEI may act as an ion tunnel that only passes the lithium ions between the electrolyte solution and the anode.

Various non-aqueous organic solvents have been used in non-aqueous electrolyte solutions to date and among these organic solvents, propylene carbonate is being used as a non-aqueous organic solvent. However, propylene carbonate may cause an irreversible decomposition reaction with a graphite material. In order to replace the propylene carbonate, binary and tertiary non-aqueous organic solvents based on ethylene carbonate (EC) have been used. However, since EC has a high melting point, its operating temperature may be limited and battery performance may be significantly reduced at a low temperature.

DISCLOSURE OF THE INVENTION

Technical Problem

The present invention provides a non-aqueous electrolyte solution which may simultaneously improve room temperature and high-temperature cycle characteristics and capacity characteristics after high-temperature storage, as well as low-temperature and room temperature output characteristics, and a lithium secondary battery including the same.

Technical Solution

According to an aspect of the present invention, there is provided a non-aqueous electrolyte solution including: i) a non-aqueous organic solvent including propylene carbonate (PC) and ethylene carbonate (EC); and ii) lithium bis(fluorosulfonyl)imide (LiFSI).

According to another aspect of the present invention, there is provided a lithium secondary battery including: a cathode including a cathode active material; an anode including an anode active material; a separator disposed between the cathode and the anode; and the non-aqueous electrolyte solution.

Advantageous Effects

According to a non-aqueous electrolyte solution of the present invention, since a robust solid electrolyte interface (SEI) may be formed on an anode during initial charge of a lithium secondary battery including the non-aqueous electrolyte solution, high-temperature and room temperature cycle characteristics and capacity characteristics after high-temperature storage as well as low-temperature and room temperature output characteristics may be simultaneously improved.

MODE FOR CARRYING OUT THE INVENTION

Figure 1:
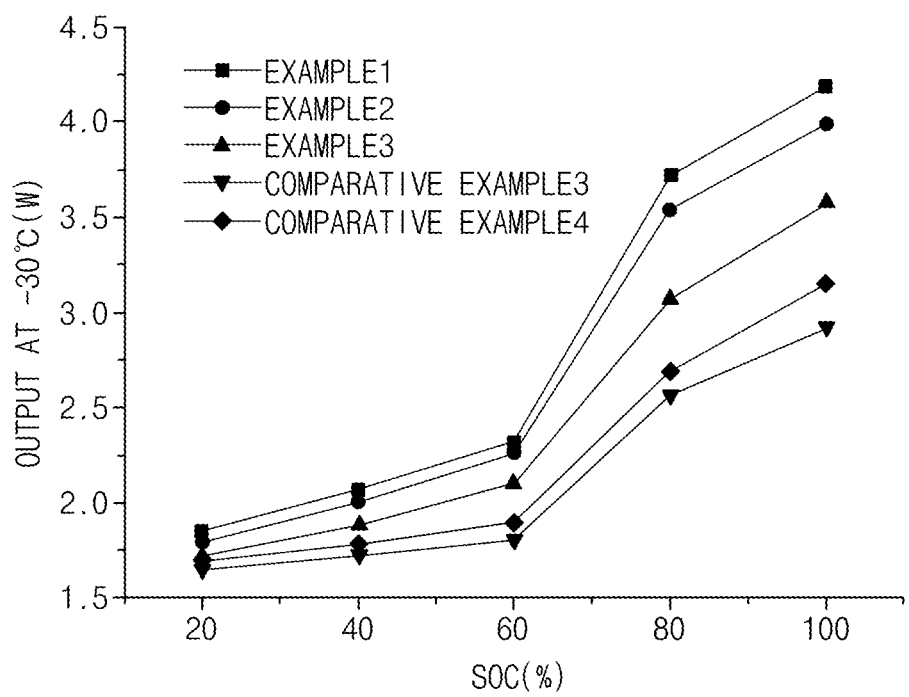
FIG. 1 is a graph illustrating the results of the measurement of low-temperature output characteristics of lithium secondary batteries of Examples 1 to 3 and Comparative Examples 3 and 4 according to Experimental Example 1.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A non-aqueous electrolyte solution according to an embodiment of the present invention may include a non-aqueous organic solvent including propylene carbonate (PC) and ethylene carbonate (EC); and lithium bis(fluorosulfonyl)imide (LiFSI).

According to an embodiment of the present invention, limitations, which occur when propylene carbonate (PC) and ethylene carbonate (EC) are separately used, may be addressed by adjusting a mixing ratio of the PC and the EC, as non-aqueous organic solvents, and a synergetic effect due to the mixture use of the non-aqueous organic solvents may be exhibited by using the advantages of each solvent. Also, in a case where lithium bis(fluorosulfonyl)imide is used in combination with the mixed non-aqueous organic solvent, a solid SEI layer is formed on an anode during initial charge to suppress the decomposition of the surface of a cathode, which may occur during the operation of high-temperature cycle at 45° C. or more, as well as low-temperature and room temperature output characteristics, and prevent an oxidation reaction of an electrolyte solution. Thus, capacity characteristics of a lithium secondary battery may be simultaneously improved.

In general, ethylene carbonate (EC), as a non-aqueous organic solvent used in a non-aqueous electrolyte solution, has been mainly used in lithium secondary batteries due to its excellent affinity with a carbon material. However, in a case where EC is excessively used, $CO_2$ gas may be generated due to the decomposition of EC. Thus, the performance of a secondary battery may not only be adversely affected, but also low-temperature characteristics may be poor due to high melting point characteristics and high-output characteristics may be poor due to low conductivity.

In contrast, a non-aqueous electrolyte solution including propylene carbonate may exhibit high-output characteristics due to excellent low-temperature characteristics and high conductivity. However, since propylene carbonate may cause an irreversible decomposition reaction with a graphite material, the use thereof with graphite may be limited. Also, the reduction of the capacity of a lithium secondary battery may occur due to an exfoliation phenomenon of an electrode caused by propylene carbonate during high-temperature cycles according to the thickness of the electrode.

In particular, in a case where propylene carbonate is used with a lithium salt, such as $LiPF_6$, as a non-aqueous organic solvent, an enormous amount of irreversible reactions may occur during a process of forming the SEI in a lithium secondary battery using a carbon electrode and a process of intercalating lithium ions, which are solvated by the propylene carbonate, between carbon layers. This may cause the degradation of the battery performance such as cycle characteristics.

Also, when the lithium ions solvated by the propylene carbonate are intercalated into the carbon layers constituting the anode, exfoliation of a carbon surface layer may proceed. The exfoliation may occur because gas, which is generated when the solvent decomposes between the carbon layers, causes a large distortion in the carbon layers. The exfoliation of the surface layer and the decomposition of the electrolyte solution may continuously proceed. As a result, since an effective SEI may not be formed when the electrolyte solution including propylene carbonate is used in combination with a carbon-based anode material, lithium ions may not be intercalated.

Thus, in order to address the limitations of ethylene carbonate and propylene carbonate and maximize the above-described advantages in the present invention, as a non-aqueous organic solvent, propylene carbonate is mixed with typical ethylene carbonate at an appropriate composition to improve conductivity characteristics of a non-aqueous electrolyte solution. Therefore, the present invention may provide a non-aqueous electrolyte solution also having excellent electrochemical affinity with a carbon layer by improving output characteristics and low-temperature characteristics of a lithium secondary battery.

Also, in the present invention, the above-described limitations, which occur when the propylene carbonate and the lithium salt, such as $LiPF_6$, are used together, may be addressed by using lithium bis(fluorosulfonyl)imide in combination therewith.

Since the lithium bis(fluorosulfonyl)imide, as a lithium salt, is added to a non-aqueous electrolyte solution to form a robust and stable SEI on an anode, the lithium bis(fluorosulfonyl)imide may improve low-temperature output characteristics. Also, the lithium bis(fluorosulfonyl)imide may suppress the decomposition of the surface of a cathode, which may occur during high-temperature cycles, and may prevent an oxidation reaction of an electrolyte solution.

According to an embodiment of the present invention, a mixing ratio of the propylene carbonate to the ethylene carbonate, as the non-aqueous organic solvent, may significantly affect the improvement of low-temperature and room temperature output characteristics, and capacity characteristics after high-temperature storage.

The mixing ratio of the propylene carbonate to the ethylene carbonate is in a range of 1:0.1 to 1:2, preferably in a range of 1:0.3 to 1:1, and more preferably in a range of 1:0.4 to 1:0.9. In the case that the above range of the mixing ratio is satisfied, a synergistic effect due to the mixing of the two non-aqueous organic solvents may be obtained.

Propylene carbonate, as a non-aqueous organic solvent according to an embodiment of the present invention, may be included in an amount of 5 parts by weight to 60 parts by weight, preferably, 10 parts by weight to 40 parts by weight based on 100 parts by weight of the non-aqueous organic solvent. In the case that the amount of the propylene carbonate is less than 5 parts by weight, since gas may be continuously generated due to the decomposition of the surface of the cathode during high-temperature cycles, a swelling phenomenon may occur in which a thickness of the battery increases. In the case in which the amount of the propylene carbonate is greater than 60 parts by weight, a robust SEI may be difficult to be formed on the anode during the initial charge and high-temperature characteristics may degrade.

According to an embodiment of the present invention, an optimum effect on capacity characteristics after high-temperature storage as well as low-temperature and room temperature output characteristics of the lithium secondary battery may be achieved by appropriately adjusting the amount of the ethylene carbonate within the range of the mixing ratio, in the above amount of the propylene carbonate included.

According to an embodiment of the present invention, a non-aqueous organic solvent, which may be included in the non-aqueous electrolyte solution in addition to the ethylene carbonate and propylene carbonate, is not limited as long as it may minimize the decomposition due to the oxidation reaction during charge and discharge of the battery and may exhibit desired characteristics with additives.

The non-aqueous organic solvent, which may be further included in the non-aqueous electrolyte solution according to the embodiment of the present invention, for example, may further include any one selected from the group consisting of ethyl propionate (EP), methyl propionate (MP), butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

According to an embodiment of the present invention, a concentration of the lithium bis(fluorosulfonyl)imide in the non-aqueous electrolyte solution may be in a range of 0.1 mole/l to 2 mole/l, for example, 0.5 mole/l to 1.5 mole/l. In the case that the concentration of the lithium bis(fluorosulfonyl)imide is less than 0.1 mole/l, effects of improving the low-temperature output and high-temperature cycle characteristics of the battery may be insignificant. In the case in which the concentration of the lithium bis(fluorosulfonyl) imide is greater than 2 mole/e, side reactions in the electrolyte solution may excessively occur during the charge and discharge of the battery, and thus, the swelling phenomenon may occur.

In order to further prevent the side reactions, the non-aqueous electrolyte solution of the present invention may further include a lithium salt. Any lithium salt typically used in the art may be used as the lithium salt. For example, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

A mixing ratio of the lithium salt to the lithium bis(fluorosulfonyl)imide may be in a range of 1:1 to 1:9 as a molar ratio. In the case that the mixing ratio of the lithium salt to the lithium bis(fluorosulfonyl)imide is outside the range of the molar ratio, the side reactions may excessively occur in the electrolyte solution during the charge and discharge of the battery, and thus, the swelling phenomenon may occur.

In particular, the mixing ratio of the lithium salt to the lithium bis(fluorosulfonyl)imide may be preferably in a range of 1:6 to 1:9 as a molar ratio. Specifically, in the case in which the mixing ratio of the lithium salt to the lithium bis(fluorosulfonyl)imide is less than 1:6 as a molar ratio, the enormous amount of irreversible reactions may occur during the process of forming the SEI in the lithium-ion battery and the process of intercalating lithium ions, which are solvated by the propylene carbonate and ethylene carbonate, into the anode, and the effects of improving the low-temperature output, and the cycle characteristics and capacity characteristics after high-temperature storage of the secondary battery may be insignificant due to the exfoliation of an anode surface layer (e.g., carbon surface layer) and the decomposition of the electrolyte solution.

The non-aqueous electrolyte solution according to the embodiment of the present invention may further include at least one compound selected from the group consisting of $LiBF_4$, lithium oxalyldifluoroborate (LiODFB), and ethylene sulfate (ES), as an additive. Also, for example, the non-aqueous electrolyte solution may include two or more compounds selected from the group consisting of $LiBF_4$, LiODFB, and ES. The additive may prevent a side reaction in the electrolyte solution during the charge and discharge of the lithium secondary battery including an excessive amount of lithium bis(fluorosulfonyl)imide at room temperature. Accordingly, the additive may effectively improve cycle characteristics of the battery at room temperature. In this case, an amount of each additive may be in a range of 0.01 wt % to 5 wt % based on the total weight of the electrolyte solution.

A lithium secondary battery according to an embodiment of the present invention may include a cathode including a cathode active material; an anode including an anode active material; a separator disposed between the cathode and the anode; and the non-aqueous electrolyte solution.

Herein, the cathode active material may include a manganese spinel-based active material, lithium metal oxide, or a mixture thereof. Furthermore, the lithium metal oxide may be selected from the group consisting of lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

As the anode active material, a carbon-based anode active material, such as crystalline carbon, amorphous carbon, or a carbon composite, may be used alone or in combination of two or more thereof. For example, the anode active material may include graphitic carbon such as natural graphite and artificial graphite.

Specifically, in a lithium secondary battery, a slurry is prepared by mixing a predetermined solvent with a mixture of a cathode or anode active material, a conductive agent, and a binder, and the cathode or anode, for example, may then be prepared by coating a cathode or anode collector with the slurry and drying.

According to an embodiment of the present invention, the cathode collector is generally fabricated to have a thickness of 3 μm to 500 μm. The cathode collector is not particularly limited so long as it has high conductivity without causing adverse chemical changes in the batteries. The cathode collector may be formed of, for example, stainless steel, aluminum, nickel, titanium, fired carbon, or aluminum or stainless steel that is surface-treated with one of carbon, nickel, titanium, silver, or the like.

The cathode collector may have an uneven surface to improve the bonding strength of a cathode active material and may have any of various shapes such as that of a film, a sheet, a foil, a net, a porous body, a foam body, a non-woven fabric body, and the like.

The anode collector is generally fabricated to have a thickness of 3 μm to 500 μm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength with an anode active material. The anode collector may have various shapes such as a film, a sheet, a foil, a net, a porous body, a foam body, a non-woven fabric body, and the like.

The conductive agent used in the cathode or anode slurry is typically added in an amount of 1 wt % to 20 wt % based on the total weight of the mixture including the cathode or anode active material. Any conductive agent may be used without particular limitation so long as it has suitable conductivity without causing adverse chemical changes in the batteries. For example, the conductive agent may include conductive material such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives.

The binder is a component that assists the binding between the cathode or anode active material and the conductive agent, and the binding with the current collector. The binder is typically added in an amount of 1 wt % to 20 wt % based on the total weight of the compound including the cathode or anode active material. Examples of the binder may include various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers.

Also, preferred examples of the solvent may include dimethyl sulfoxide (DMSO), alcohol, N-methylpyrrolidone (NMP), acetone, or water, and the solvent is removed in a drying process.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

Any battery case typically used in the art may be selected as a battery case used in the present invention. A shape of the lithium secondary battery according to the use thereof is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Hereinafter, the present invention will be described in more detail, according to examples and experimental examples. However, the present invention is not limited thereto.

Example 1

Preparation of Non-Aqueous Electrolyte Solution

A non-aqueous electrolyte solution was prepared by adding 0.1 mole/l of $LiPF_6$ and 0.9 mole/l of lithium bis(fluorosulfonyl)imide, as a lithium salt, based on a total weight of the non-aqueous electrolyte solution to a non-aqueous organic solvent having a composition in which a volume ratio of propylene carbonate (PC):ethylene carbonate (EC):ethylmethyl carbonate (EMC) was 3:3:4.

Preparation of Lithium Secondary Battery

A cathode mixture slurry was prepared by adding 96 wt % of a mixture of $LiMn_2O_4$ and $Li(Ni_{0.33}Co_{0.33}Mn_{0.33})O_2$ as a cathode active material, 2 wt % of carbon black as a conductive agent, and 2 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare a cathode.

Also, an anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode collector was coated with the anode mixture slurry and dried, and the Cu thin film was then roll-pressed to prepare an anode.

A polymer type battery was prepared by a typical method using a separator formed of three layers of polypropylene/polyethylene/polypropylene (PP/PE/PP) with the cathode and anode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that 0.14 mole/l of $LiPF_6$ and 0.86 mole/l of lithium bis(fluorosulfonyl)imide (molar ratio of about 1:6) were used as a lithium salt based on a total weight of the non-aqueous electrolyte solution.

Example 3

A non-aqueous electrolyte solution and a lithium secondary battery were prepared in the same manner as in Example 1 except that 0.17 mole/l of $LiPF_6$ and 0.83 mole/l of lithium bis(fluorosulfonyl)imide (molar ratio of about 1:5) were used.

Example 4

A non-aqueous electrolyte solution and a lithium secondary battery were prepared in the same manner as in Example 2 except that 1 wt % of ethylene sulfate (ES) was further added as an additive based on a total weight of the non-aqueous electrolyte solution.

Example 5

A non-aqueous electrolyte solution and a lithium secondary battery were prepared in the same manner as in Example 2 except that 1 wt % of ES and 0.5 wt % of LiBF$_4$ were further added as an additive based on a total weight of the non-aqueous electrolyte solution.

Example 6

A non-aqueous electrolyte solution and a lithium secondary battery were prepared in the same manner as in Example 2 except that 1 wt % of ES and 0.5 wt % of lithium oxalyldifluoroborate (LiODFB) were further added as an additive based on a total weight of the non-aqueous electrolyte solution.

Comparative Example 1

A non-aqueous electrolyte solution and a lithium secondary battery were prepared in the same manner as in Example 1 except that ethylene carbonate (EC) was not used and a non-aqueous organic solvent having a composition, in which a volume ratio of PC:EMC was 3:7, was used.

Comparative Example 2

A non-aqueous electrolyte solution and a lithium secondary battery were prepared in the same manner as in Example 1 except that propylene carbonate (PC) was not used and a non-aqueous organic solvent having a composition, in which a volume ratio of EC:EMC was 3:7, was used.

Comparative Example 3

A non-aqueous electrolyte solution and a lithium secondary battery were prepared in the same manner as in Example 1 except that LiPF$_6$ was used alone as a lithium salt.

Comparative Example 4

A non-aqueous electrolyte solution and a lithium secondary battery were prepared in the same manner as in Example 1 except that LiPF$_6$ and lithium bis(fluorosulfonyl)imide were used at a molar ratio of about 1:0.5.

Experimental Example 1

Low-Temperature Output Characteristics Test According to Molar Ratio of LiPF$_6$ to LiFSI Low-temperature outputs were calculated from voltage differences which were obtained by discharging the lithium secondary batteries of Examples 1 to 3 and Comparative Examples 3 and 4 at 0.5 C for 10 seconds for the state of charge (SOC) at −30° C. The results thereof are presented in FIG. 1.

Referring to FIG. 1, in a case where a molar ratio of LiPF$_6$ to lithium bis(fluorosulfonyl)imide (LiFSI) is 1:5 to 1:9 when the SOC was 100%, it may be understood that low-temperature output characteristics were significantly improved in comparison to Comparative Example 4 having the molar ratio of 1:0.5 and Comparative Example 3 in which LIFSI was not used but LiPF$_6$ was used alone. In particular, it may be understood that that the low-temperature output characteristics were improved as the amount of LiFSI increased.

Specifically, with respect to Example 1 in which the molar ratio of LiPF$_6$ to LiFSI is 1:9, it may be understood that the low-temperature output characteristics were improved by about 38% in comparison to those of Comparative Example 4 having the molar ratio of 1:0.5 and were improved by 40% or more in comparison to those of Comparative Example 3 in the case that the SOC was 100%. Similarly, in a case where the SOC was 20%, 40%, 60%, and 80%, excellent results may be obtained similar to the case in which the SOC was 100%.

When comparing Example 2, in which the molar ratio of LiPF$_6$ to LiFSI is 1:6, with Example 3 having the molar ratio of 1:5, it may be understood that despite the fact that the difference in the molar ratios was only 1, low-temperature output characteristics of Example 2 were significantly different from those of Example 3 in consideration of an increase in the amount of LIFSI in Example 3.

Therefore, it may be confirmed that the low-temperature output characteristics of the lithium secondary battery may be improved by adjusting the molar ratio of LiPF$_6$ to LiFSI.

Experimental Example 2

High-Temperature Cycle Characteristics Test of Lithium Secondary Battery

The lithium secondary batteries of Examples 1 to 3 and Comparative Examples 1 to 4 were charged at 1 C to 4.2 V/38 mA at 45° C. under a constant current/constant voltage (CC/CV) condition and then discharged at a constant current (CC) of 3 C to a voltage of 3.03 V to measure discharge capacities. The charge and discharge were repeated 1 to 900 cycles and the measured discharge capacities are presented in FIG. 2.

Figure 2:
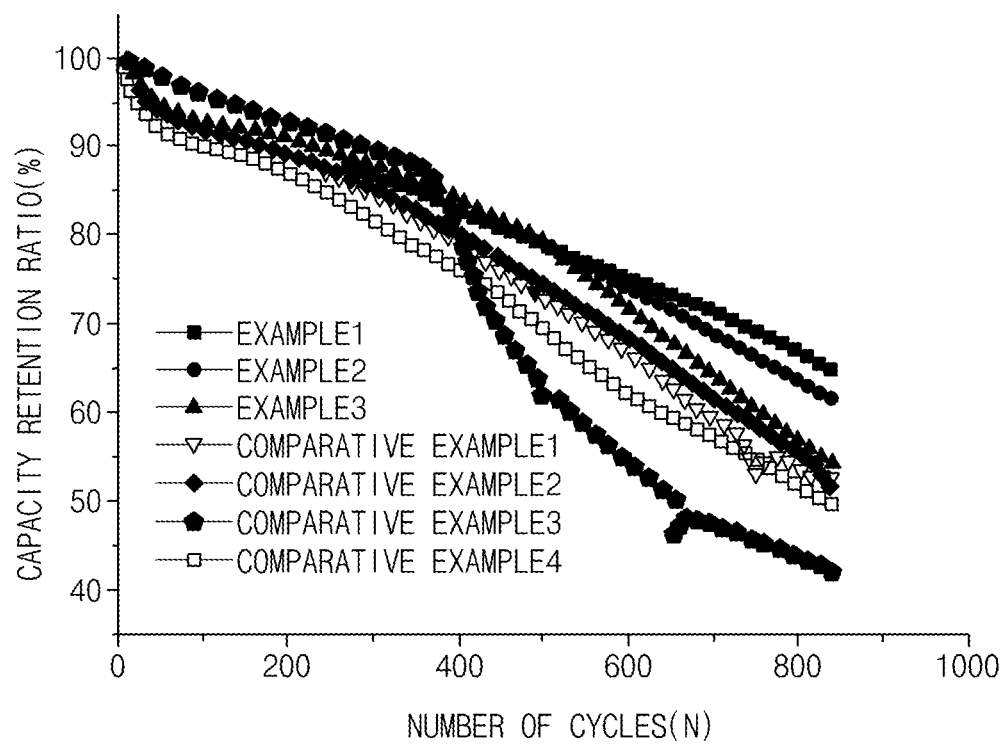
FIG. 2 is a graph illustrating the results of the measurement of high-temperature (45° C.) cycle characteristics of lithium secondary batteries of Examples 1 to 3 and Comparative Examples 1 to 4 according to Experimental Example 2.

Referring to FIG. 2, with respect to high-temperature cycle characteristics, the lithium secondary batteries of Examples 1 to 3 initially exhibited capacity retention ratios similar to those of Comparative Examples 1 to 4 to a 350$^{th}$ cycle. The capacity retention ratios of Examples 1 to 3 were significantly different from those of Comparative Examples 1 to 4 as the number of cycles increased, in particular, after a 600$^{th}$ cycle.

Also, in a 800$^{th}$ cycle, it may be understood that the capacity retention ratios of Example 1 and 2 were improved by about 30% or more in comparison to those of Comparative Examples 1, 2, and 4, and were improved by about 40% in comparison to that of Comparative Example 3.

Experimental Example 3

Capacity Characteristics After High-Temperature Storage Test According to Molar Ratio of LiPF$_6$ to LiFSI The lithium secondary batteries of Examples 1 to 3 and Comparative Examples 3 and 4 were stored at 60° C. and then charged at 1 C to 4.2 V/38 mA under a CC/CV condition. Then, the lithium secondary batteries were discharged at a CC of 1 C to a voltage of 3.0 V to measure discharge capacities. The results thereof are presented in FIG. 3.

Figure 3:
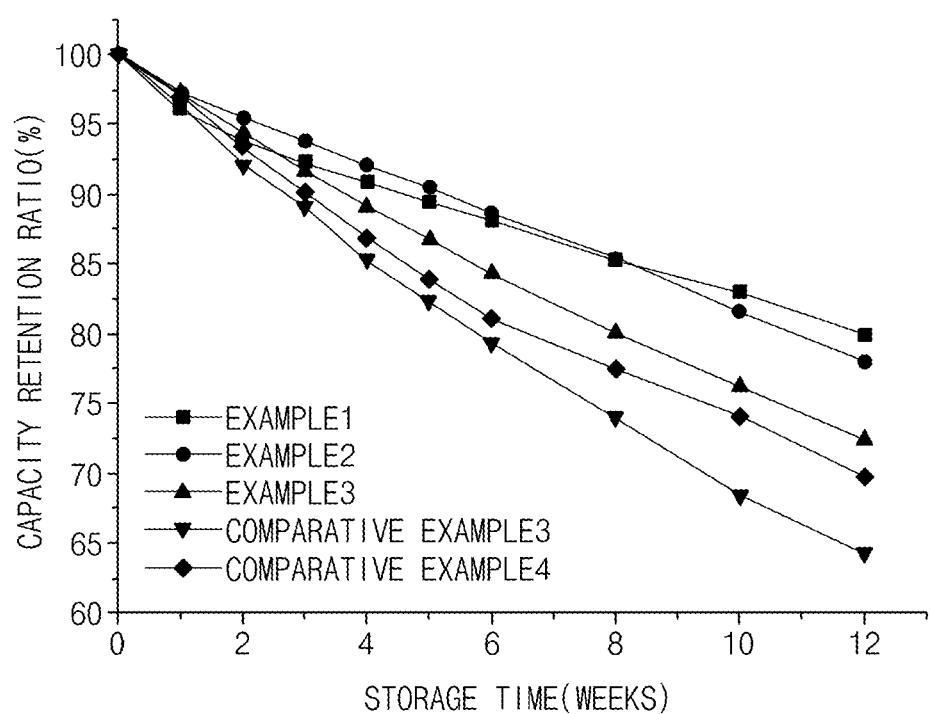
FIG. 3 is a graph illustrating the results of the measurement of capacity characteristics after high-temperature storage (60° C.) of lithium secondary batteries of Examples 1 to 3 and Comparative Examples 3 and 4 according to Experimental Example 3.

Referring to FIG. 3, slopes of capacity retention ratios of the lithium secondary batteries of Examples 1 to 3 were slower than those of the lithium secondary batteries of Comparative Examples 3 and 4 up to a storage time of 12 weeks. In particular, it may be understood that the slopes of Examples 1 to 3, in which the molar ratio of LiPF$_6$ to LiFSI was 1:6 or more, were significantly different from those of Comparative Examples 3 and 4.

In contrast, with respect to Comparative Example 4 having the molar ratio of 1:0.5 and Comparative Example 3 in which LiFSI was not used but LiPF$_6$ was used alone, capacity retention ratios at a storage time of 12 weeks were significantly decreased by 20% or more in comparison to those of Examples 1 and 2 of the present application.

Thus, the high-temperature storage characteristics of the lithium secondary battery may be improved by adjusting the molar ratio of LiPF$_6$ to LiFSI. In particular, it may be confirmed that the high-temperature storage characteristics of the lithium secondary batteries, in which the molar ratio of LiPF$_6$ to LiFSI was in a range of 1:6 to 1:9, were significantly better than those of the lithium secondary batteries in which the molar ratio was outside the above range.

Therefore, it may be confirmed that the capacity characteristics of the lithium secondary battery may be improved by adjusting the molar ratio of LiPF$_6$ to LiFSI.

Experimental Example 4

Room Temperature (25° C.) Cycle Characteristics Test of Examples 4 to 6

In order to investigate room temperature (25° C.) cycle characteristics according to the addition of at least one compound selected from the group consisting of LiBF4, lithium oxalyldifluoroborate (LiODFB), and ethylene sulfate (ES) to an electrolyte solution, the lithium secondary batteries of Examples 4 to 6 were charged at 1 C to 4.2 V/38 mA at 25° C. under a constant current/constant voltage (CC/CV) condition and then discharged at a constant current (CC) of 2 C to a voltage of 3.03 V to measure discharge capacities. The charge and discharge were repeated 1 to 1,200 cycles, and the measured discharge capacities are presented in FIG. 4.

Figure 4:
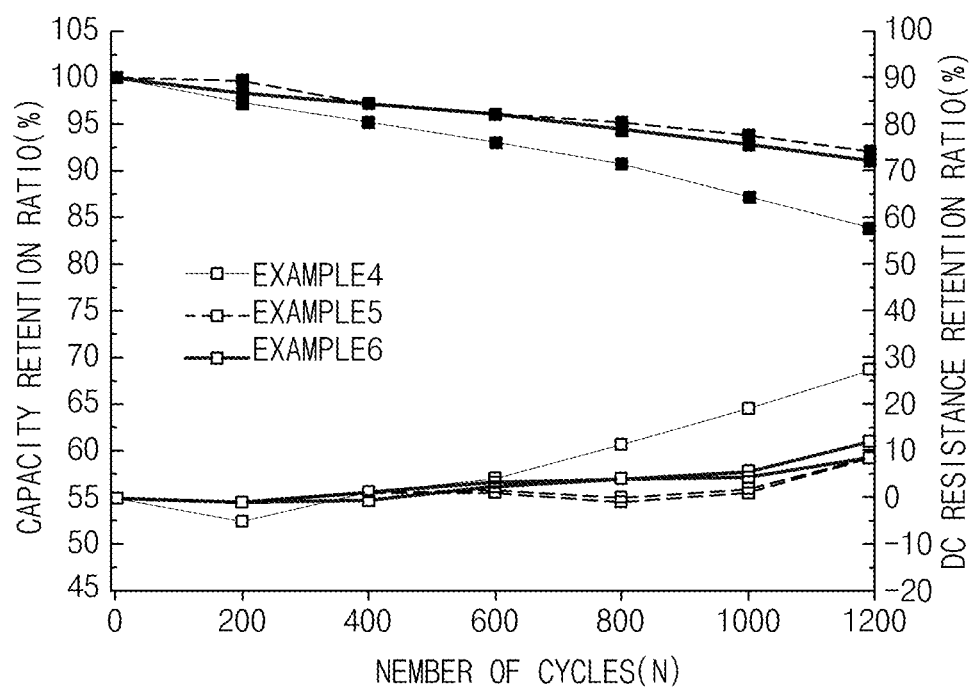
FIG. 4 is a graph illustrating the results of the measurement of capacity characteristics after room temperature storage (25° C.) of lithium secondary batteries of Examples 4 to 6 according to Experimental Example 4.

As illustrated in FIG. 4, it may be confirmed that the lithium secondary batteries of Examples 4 to 6 according to the present invention exhibited capacity retention ratios similar to one another to about a 400$^{th}$ cycle and Examples 4 to 6 exhibited good capacity characteristics over 1,200 cycles. In particular, it may be confirmed that capacity characteristics from about the 400$^{th}$ cycle to a 1,200$^{th}$ cycle of the lithium secondary batteries having a combination of two kinds of additives (Examples 5 and 6) were better.

INDUSTRIAL APPLICABILITY

According to a non-aqueous electrolyte solution of the present invention, since a robust SEI may be formed on an anode during initial charge of a lithium secondary battery including the non-aqueous electrolyte solution, high-temperature and room temperature cycle characteristics and capacity characteristics after high-temperature storage as well as low-temperature and room temperature output characteristics may be simultaneously improved. Therefore, the non-aqueous electrolyte solution may be suitable for lithium secondary batteries.

The invention claimed is:

1. A non-aqueous electrolyte solution comprising:
   i) a non-aqueous organic solvent including propylene carbonate (PC) and ethylene carbonate (EC);
   ii) a first lithium salt comprising lithium bis(fluorosulfonyl)imide (LiFSI)
   iii) a second lithium salt;
   wherein a mixing ratio of the second lithium salt to the lithium bis(fluorosulfonyl)imide is in a range of 1:6 to 1:9 as a molar ratio; and
   wherein an amount of the propylene carbonate is in a range of 5 parts by weight to 60 parts by weight based on 100 parts by weight of the non-aqueous organic solvent and a mixing ratio of the propylene carbonate to the ethylene carbonate is in a range of 1:0.1 to 1:2 as a weight ratio.

2. The non-aqueous electrolyte solution of claim 1, wherein a concentration of the lithium bis(fluorosulfonyl) imide in the non-aqueous electrolyte solution is in a range of 0.1 mole/l to 2 mole/l.

3. The non-aqueous electrolyte solution of claim 1, wherein the amount of the propylene carbonate is in a range of 10 parts by weight to 40 parts by weight based on 100 parts by weight of the non-aqueous organic solvent.

4. The non-aqueous electrolyte solution of claim 1, wherein the non-aqueous organic solvent further comprises any one selected from the group consisting of ethyl propionate (EP), methyl propionate (MP), butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

5. The non-aqueous electrolyte solution of claim 1, wherein the second lithium salt comprises any one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, and LiC$_4$BO$_8$, or a mixture of two or more thereof.

6. The non-aqueous electrolyte solution of claim 1, further comprising at least one compound selected from the group consisting of LiBF$_4$, lithium oxalyldifluoroborate (LiODFB), and ethylene sulfate (ES).

7. The non-aqueous electrolyte solution of claim 1, further comprising two or more compounds selected from the group consisting of LiBF$_4$, LiODFB, and ES.

8. A lithium secondary battery comprising:
   a cathode including a cathode active material composition;
   an anode including an anode active material;
   a separator disposed between the cathode and the anode; and
   the non-aqueous electrolyte solution of claim 1.

9. The lithium secondary battery of claim 8, wherein the cathode active material comprises a manganese spinel-based active material, lithium metal oxide, or a mixture thereof.

10. The lithium secondary battery of claim 9, wherein the lithium metal oxide is selected from the group consisting of lithium-manganese-based oxide, lithium-nickel-manganese-based oxide, lithium-manganese-cobalt-based oxide, and lithium-nickel-manganese-cobalt-based oxide.

* * * * *